United States Patent
Higuchi et al.

(10) Patent No.: US 11,781,001 B2
(45) Date of Patent: Oct. 10, 2023

(54) PROPYLENE POLYMER COMPOSITION

(71) Applicant: SUMITOMO CHEMICAL COMPANY, LIMITED, Tokyo (JP)

(72) Inventors: Yu Higuchi, Chiba (JP); Masahiro Yanagisawa, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 232 days.

(21) Appl. No.: 17/423,617

(22) PCT Filed: Jan. 15, 2020

(86) PCT No.: PCT/JP2020/000977
§ 371 (c)(1),
(2) Date: Jul. 16, 2021

(87) PCT Pub. No.: WO2020/149284
PCT Pub. Date: Jul. 23, 2020

(65) Prior Publication Data
US 2022/0112366 A1 Apr. 14, 2022

(30) Foreign Application Priority Data
Jan. 18, 2019 (JP) .................. 2019-007245

(51) Int. Cl.
*C08L 23/08* (2006.01)
*C08L 23/10* (2006.01)
*C08L 23/12* (2006.01)
*C08L 23/14* (2006.01)

(52) U.S. Cl.
CPC .................. *C08L 23/14* (2013.01)

(58) Field of Classification Search
CPC .. C08F 210/02; C08F 293/00; C08F 293/005; C08F 10/06; C08F 110/06; C08F 210/06; C08L 23/08; C08L 53/00; C08L 23/10; C08L 23/12; C08L 23/14; C08L 23/142
See application file for complete search history.

(56) References Cited

U.S. PATENT DOCUMENTS

| | | |
|---|---|---|
| 2008/0262140 A1 | 10/2008 | Xavier et al. |
| 2015/0259453 A1 | 9/2015 | Peterson et al. |
| 2016/0024289 A1 | 1/2016 | Peterson et al. |
| 2016/0145426 A1 | 5/2016 | Peterson et al. |
| 2016/0229986 A1 | 8/2016 | Peterson et al. |
| 2016/0257810 A1 | 9/2016 | Peterson et al. |

FOREIGN PATENT DOCUMENTS

| | | |
|---|---|---|
| JP | H11130932 A | 5/1999 |
| JP | 2000-026697 A | 1/2000 |
| JP | 2002-146152 A | 5/2002 |
| JP | 2004-010775 A | 1/2004 |
| JP | 2004-051769 A | 2/2004 |
| JP | 2007517957 A | 7/2007 |
| JP | 2008-019347 A | 1/2008 |
| JP | 2008-208305 A | 9/2008 |
| JP | 2016-194024 A | 11/2016 |
| JP | 2018104673 A | 7/2018 |

OTHER PUBLICATIONS

Machine translation of JP2002146152 (Year: 2023).*
International Search Report and Written Opinion in PCT/JP2020/000977, dated Mar. 13, 2020. 10 pages.

* cited by examiner

*Primary Examiner* — Irina S Zemel
*Assistant Examiner* — Jeffrey S Lenihan
(74) *Attorney, Agent, or Firm* — Meunier Carlin & Curfman LLC (57) ABSTRACT

A propylene polymer composition comprising a propylene polymer and an ethylene-α-olefin copolymer (provided that the ethylene-α-olefin copolymer is not the propylene polymer), the propylene polymer composition satisfying requirement (I):
Requirement (I) an absolute value of a difference between a die swell ratio at a shear rate of 24 sec$^{-1}$ and a die swell ratio at a shear rate of 6,080 sec$^{-1}$ is 0.29 or less.
One embodiment of the present invention is a propylene polymer composition which additionally satisfies the requirement (II).
Requirement (II): The ethylene triad chains (EEE) in an ortho-dichlorobenzene-insoluble fraction are 2.0 mol % or more.

6 Claims, 1 Drawing Sheet

PROPYLENE POLYMER COMPOSITION

CROSS REFERENCE TO RELATED APPLICATIONS

This application is a United States National Phase Patent Application of International Patent Application Number PCT/JP2020/000977, filed on 15 Jan. 2020, which claims the benefit of priority to JP Application No. 2019-007245, filed 18 Jan. 2019, the contents of which are incorporated by reference herein in their entirety.

TECHNICAL FIELD

The present invention relates to a propylene polymer composition and a producing method thereof, and a molded article obtained from the propylene polymer composition. More specifically, the present invention relates to a propylene polymer composition, which gives low gloss product when formed, and a producing method thereof. Moreover, the present invention relates to a molded article with low gloss made from the propylene polymer composition.

BACKGROUND ART

The molded articles comprising a propylene polymer have been used as exterior parts and interior parts of automobiles.

Parts of automobiles require impact strength, and improvement of impact strength of molded articles containing a propylene polymer has been studied conventionally. For example, Patent document 1 describes, as a composition for improving the impact strength, a thermoplastic polyolefin alloy containing a polypropylene block copolymer, an ethylene elastomer, and a styrene-ethylene/butylene-styrene block copolymer.

PRIOR ART DOCUMENT

Patent Document

Patent Document 1: JP-A-2007-517957

SUMMARY OF THE INVENTION

Problems to be Solved by the Invention

Recently, lower surface gloss has been demanded for the sake of texture and luxury especially for interior parts of automobiles in addition to the impact strength.

An object of the present invention is to provide a propylene polymer composition from which a molded article with a low gloss and an excellent impact strength can be obtained.

Means for Solving the Problems

As a result of diligently studying shear rate dependency of die swell ratio, paying attention to the importance of the flowability of the propylene polymer composition, the present inventors found that molding of a propylene polymer composition with a low shear rate dependency of the die swell ratio would lower gloss of a molded article obtained from therefrom, thereby accomplishing the present invention.

In other words, the present invention relates to the following [1] to [4].

[1] A propylene polymer composition comprising a propylene polymer and an ethylene-α-olefin copolymer (provided that the ethylene-α-olefin copolymer is not the propylene polymer), the propylene polymer composition satisfying requirement (I):

Requirement (I) an absolute value of a difference between a die swell ratio at a shear rate of 24 $sec^{-1}$ and a die swell ratio at a shear rate of 6,080 $sec^{-1}$ is 0.29 or less.

[2] The propylene polymer composition according to [1], wherein requirement (II) is satisfied, the requirement (II) being such that ethylene triad chains (EEE) in an ortho-dichlorobenzene-insoluble fraction are 2.0 mole or more.

[3] The propylene polymer composition according to [1] or [2], wherein requirement (III) is satisfied, The requirement (III) being such that a degree of cross-linking parameter measured by 3D GPC is 1.06 or less.

[4] The propylene polymer composition according to any one of [1] to [3], wherein an ethylene content in the ortho-dichlorobenzene-insoluble fraction is 3.1 mass % or more.

Further, the present invention relates to the following [5] to [8].

[5] A method for producing the propylene polymer composition according to any one of [1] to [4], the method comprising:

a step of obtaining a composition precursor by melt-kneading the propylene polymer and the ethylene-α-olefin copolymer together (provided that the ethylene-α-olefin copolymer is not the propylene polymer); and a step of obtaining the propylene polymer composition by melt-kneading the composition precursor and a cross-linking agent together.

[6] A propylene polymer composition, being produced by the method according to [5].

[7] A molded article, comprising the propylene polymer composition according to any one of [1] to [4].

[8] Use of the molded article according to [7] for an automobile interior.

Effect of the Invention

By forming the propylene polymer composition according to the present invention, it is possible to obtain a molded article with a low gloss. Moreover, the molded article thus obtained is excellent in impact strength.

MODE FOR CARRYING OUT THE INVENTION

A propylene polymer composition according to the present invention is a propylene polymer composition which comprises a propylene polymer and an ethylene-α-olefin copolymer (provided that the ethylene-α-olefin copolymer is not the propylene polymer), and which satisfies requirement (I).

Requirement (I): An absolute value of a difference between a die swell ratio at a shear rate of 24 $sec^{-1}$ and a die swell ratio at a shear rate of 6,080 $sec^{-1}$ is 0.29 or less.

In this Description, the term "propylene polymer" is a polymer containing, by 80 mass % or more of a structural unit derived from propylene (where a total mass of the propylene polymer is 100 mass %). The propylene polymer is exemplified by a propylene homopolymer, and a copolymer containing a structural unit derived from propylene and a structural unit derived from a monomer other than propylene. Such a structural unit derived from a monomer other than propylene contained in the propylene polymer is exemplified by a structural unit derived from a C4 to C12 α-olefin(s).

The propylene polymer composition may contain only one kind of the propylene polymer or two or more kinds of propylene polymers.

The content of the structural unit derived from propylene in the propylene polymer may be preferably 90 mass % or more, more preferably 95 mass % or more, or further preferably 98 mass % or more for the sake of rigidity of the molded article obtainable from the propylene polymer.

In this Description, the term "ethylene-α-olefin copolymer" is a copolymer containing an ethylene-derived structural unit and an α-olefin-derived structural unit (provided that the ethylene-α-olefin copolymer is not the propylene polymer).

The content of the ethylene-derived structural unit in ethylene-α-olefin copolymer may be the preferably in a range of 20 to 99 mass %, more preferably in a range of 25 to 99 mass %, or further preferably in a range of 28 to 90 mass % (where the total mass of the ethylene-α-olefin copolymer is 100 mass %) for the sake of impact strength of the molded article obtainable therefrom.

In case where the α-olefin of the ethylene-α-olefin copolymer is propylene, the content of the ethylene-derived structural unit is preferably in a range of 28 to 70 mass % for the sake of the impact strength and gloss of the molded article obtainable therefrom.

In case where the α-olefin of the ethylene-α-olefin copolymer is 1-butene, 1-hexene, or 1-octene, the content of the ethylene-derived structural unit is preferably in a range of 40 to 90 mass % for the sake of the impact strength and gloss of the molded article obtainable therefrom.

The propylene polymer composition may contain only one kind of the ethylene-α-olefin copolymer or two or more kinds of the ethylene-α-olefin copolymer.

Examples of the α-olefin in the ethylene-α-olefin copolymer include C3 to C10 α-olefins such as propylene, 1-butene, 1-pentene, 3-methyl-1-butene, 1-hexene, 4-methyl-1-pentene, 1-octene, 1-decene, and the like, and the α-olefin may be preferably propylene, 1-butene, 1-hexene, or 1-octene. The ethylene-α-olefin copolymer may contain only one kind of the α-olefin-derived structural unit or two or more kinds of the α-olefin-derived structures.

The content of the α-olefin-derived structural unit contained in the ethylene-α-olefin copolymer may be preferably 1 mass % or more but 80 mass % or less, more preferably 1 mass' or more but 75 mass % or less, or further preferably 10 mass % or more but 72 mass % or less (where the total amount of the ethylene-α-olefin copolymer is 100 mass %).

A density of the ethylene-α-olefin copolymer is preferably in a range of 0.85 to 0.93 g/cm$^3$, or more preferably in a range of 0.85 to 0.90 g/cm$^3$.

Examples of the ethylene-α-olefin copolymer include ethylene-propylene copolymer, ethylene-1-butene copolymer, ethylene-1-hexene copolymer, ethylene-1-octene copolymer, ethylene-1-decene copolymer, ethylene-(3-methyl-1-butene) copolymer, and the like.

A melt flow rate of the ethylene-α-olefin copolymer, measured at 190° C. under a load of 2.16 kg may be preferably in a range of 0.1 to 50 g/10 min, more preferably in a range of 0.2 to 40 g/10 min, or further preferably in a range of 0.2 to 35 g/10 min.

As the ethylene-α-olefin copolymer, for example, Engage®, Infuse®, and Intune® available from Dow Chemical Company Japan, Tafmer® available from Mitsui chemicals Inc., NEO-ZEX® and ULTZEX® available from Prime Polymer Co., Ltd., EXCELLEN FX®, SUMIKATHENE®, and ESPRENE SPO® available from Sumitomo Chemical Co., Ltd. are usable.

In the propylene polymer composition according to the present invention, the content of the propylene polymer may be preferably 50 mass % or more, more preferably 55 mass- or more, or further preferably 60 mass % or more, for the sake of the impact strength and rigidity, where the total amount of the propylene polymer and the ethylene-α-olefin copolymer is 100 mass %. For the sake of a better impact strength, the content of the propylene polymer may be preferably 83 mass % or less.

Moreover, the content of the ethylene-α-olefin copolymer may be preferably 50 mass % or less, more preferably 45 mass % or less, or further preferably 40 mass %, or less. For the sake of a better impact strength, a total amount of the ethylene-α-olefin copolymer may be preferably 17 mass % or more.

In case where the propylene polymer composition includes two or more kinds of the ethylene-α-olefin copolymers, the total amount thereof is within the range of the content of the ethylene-α-olefin copolymer.

The propylene polymer composition according to the present invention is a composition satisfying the requirement (I) and the propylene polymer and the ethylene-α-olefin copolymer included in the propylene polymer composition may be preferably so-called an ethylene-propylene block copolymer that is produced by polymerization of the propylene polymer by using a polymerization catalyst and then sequentially polymerizing the ethylene-α-olefin copolymer. Moreover, the polypropylene polymer composition may be obtained by separately producing the propylene polymer and the ethylene-α-olefin copolymer, and melt-kneading them, or the polypropylene polymer composition may be obtained by further adding the propylene polymer and/or the ethylene-α-olefin copolymer to the ethylene-propylene block copolymer, and melt-kneading them.

The requirement (I) satisfied by the propylene polymer composition according to the present invention is that the absolute value of a difference between a die swell ratio at the shear rate of 24 sec$^{-1}$ and a die swell ratio at the shear rate of 6,080 sec$^{-1}$ is 0.29 or less. A molded article obtained by molding such a propylene polymer composition satisfying the requirement (I) has a low gloss and a impact strength sufficient for practical uses. The evaluation of the gloss was carried out by mixing the propylene polymer composition and black pigments into a mixture, molding the mixture into a plate shape under later-described molding conditions, and measuring gloss of a surface of the plate shaped with a gloss meter.

The die swell ratio with respect to the shear rate is obtained by the following method. Using a capillary rheometer with a capillary having a capillary diameter of 1 mm, a capillary length of 40 mm, and L/D=40, the melted composition was extruded from the capillary outlet at a test temperature of 200° C. at a shear rate of 24 sec$^{-1}$ (a falling rate of a piston: 2 mm/min), thereby preparing a strand. A diameter of the strand at 12 mm from an outlet of the capillary downwardly in a perpendicular direction is measured by using laser. The die swell ratio is represented by the following equation.

die swell ratio=Diameter of Strand (mm)/Diameter of Capillary (mm)

Similarly, the melted composition was extruded from the capillary at a test temperature of 200° C. at a shear rate of 6080 sec$^{-1}$ (a falling rate of the piston: 500 mm/min), and a die swell ratio at the shear rate of 6080 sec$^{-1}$ is measured.

After the die swell ratios at these shear rates are obtained, the absolute value of the difference between the die swell ratio at the shear rate of 24 sec$^{-1}$ and the die swell ratio at the shear rate of 6,080 sec$^{-1}$ is calculated. The absolute value 6 of the difference between the die swell ratios is represented by the following equation.

$$\Delta = |(\text{die swell ratio shear rate of } 6080 \text{ sec}^{-1}) - (\text{die swell ratio shear rate of } 24 \text{ sec}^{-1})|$$

The propylene polymer composition according to the present invention is that the absolute value of a difference between a die swell ratio at the shear rate of 24 sec$^{-1}$ and a die swell ratio at the shear rate of 6,080 sec$^{-1}$ is 0.29 or less, and preferably 0.26 or less.

The propylene polymer composition according to the present invention may be further preferably configured such that the ethylene triad chains (EEE) in the ortho-dichlorobenzene-insoluble fraction be 2.0 mol % or more (Requirement (II)). The ethylene chains in the ortho-dichlorobenzene-insoluble fraction are worked out by the following method.

The ortho-dichlorobenzene-insoluble fraction in the polypropylene polymer composition is obtained by the following method.

Into a dissolving vessel of an automatic extractor, 1 g of a sample is added and 200 ml of ortho-dichlorobenzene containing dibutyl hydroxy toluene by 0.05 masse is added and stirred under heating at 140° C. for 90 min, thereby preparing a solution with a concentration of 5.0 mg/ml. Next, the sample solution is cooled down to 120° C. at a rate of 20° C./min, and maintained at 120° C. for 45 min. Next, the sample solution is cooled down to 50° C. at a rate of 2° C./min, and maintained at 50° C. for 60 min, thereby precipitating the ortho-dichlorobenzene-insoluble fraction. Next, after a solution of an ortho-dichlorobenzene-soluble fraction in the sample is discharged out of the dissolving vessel, 200 ml of ortho-dichlorobenzene is newly added, and a mixture thus obtained is stirred under heading at 140° C. for 60 min, thereby dissolving the ortho-dichlorobenzene-insoluble fraction. Next, a solution of the ortho-dichlorobenzene-insoluble fraction in the sample is discharged out of the dissolving vessel. After the solution thus discharged is stood still for one night, the solution is charged to 1000 ml of methanol. Precipitates thus obtained is filtered by suction filtration via a PTFE membrane with a pore diameter of 10 μm, washed with about 200 ml of methanol, subjected to suction filtration for removing excess methanol attached thereto, and transferred to an evaporating dish. While blowing nitrogen gas to the precipitates over the evaporating dish, the precipitates are dried with a water bath at 60° C. for 4 hours, and in a vacuum dryer at 60° C. for 4 hours. A solid thus obtained is taken as the ortho-dichlorobenzene-insoluble fraction of the sample.

<Devices, Solvent, and Sample Solution Concentration>
Device: Automatic extractor PREP-mc2 (Polymer ChAR)
Solvent: ortho-dichlorobenzene containing dibutyl hydroxy toluene by 0.05 mass % (Wako, special grade)
Sample Solution Concentration: 5.0 mg/ml An ethylene triad chains (EEE) fraction and the ethylene content is worked out by measuring carbon nuclear magnetic resonance spectrum ($^{13}$C-NMR) by a carbon nuclear magnetic resonance method, and working out the fraction according to a method described in Macromolecules (1982, 15th vol., pages 1150 to 1152) on the basis of the result of the measurement.

The propylene polymer composition according to the present invention may be preferably configured such that the ethylene content in the ortho-dichlorobenzene-insoluble fraction is 3.1 mass % or more.

Moreover, the propylene polymer composition according to the present invention may be preferably configured such that a degree of cross-linking parameter measured by 3D GPC is 1.06 or less (Requirement (III)).

The 3D GPC is a gel permeation chromatograph (GPC) provided with a differential refractive index detector, a viscosity detector and a light scattering detector, and works out absolute molecular weight and intrinsic viscosity ([η]; unit: dl/g) from data from the differential refractive index detector, the viscosity detector and the light scattering detector. From the absolute molecular weight and intrinsic viscosity, the degree of cross-linking parameter is worked out as described later.

The propylene polymer composition according to the present invention may further be preferably configured such that a degree of cross-linking parameter measured by 3D GPC is 1.0 or less.

The propylene polymer composition according to the present invention is preferably configured such that the ratio of the elution content at 50° C. measure by the CFC is 10.4 mass % or more for the sake of impact strength.

Cross Fractionation Chromatography (CFC) is a composite device combining Temperature Rising Elution Fractionation (TREF) and GPC, and can perform the GPC measurement of components in a sample eluted at arbitrary temperatures by the TREF, thereby working out an elution amounts, molecular weight distributions, and various kinds of average molecular chain lengths of the components eluted at the temperatures.

More specifically, the ratios of the elution amounts at 50° C. measured by the CFC are measured by the following method.

To 20 mg of the sample, 20 ml of ortho-dichlorobenzene containing BHT by 0.05 w/V % is added, and a mixture thus formed is stirred at 145° C. for 60 min, thereby preparing a sample solution. The sample solution is injected by 0.5 ml into a temperature rising elution fractionation (TREF) column maintained at 145° C. in CFC device and kept as such for 20 min. Next, the temperature of the TREF column is cooled down to 100° C. at a rate of 20° C./min, and kept at 100° C. for 20 min. Next, the temperature of the TREF column is cooled down to 30° C. at a rate of 2° C./min, and kept at 30° C. for 30 min. Next, the temperature of the TREF column is increased to 50° C. at a rate of 20° C./min and held to 50° C. for about 19 min. Then, the elution amounts of the components eluted at 50° C. are measured by the gel permeation chromatograph (GPC; provided in the CFC) provided with an infrared spectrometer. Then, the temperature of the TREF column is increased to 140° C. at a rate of 20° C./min and held at 140° C. for about 19 min. After that, an elution amounts of the components eluted at 140° C. are measured by using the gel permeation chromatograph (GPC; provided in the CFC) with the infrared spectrometer. The "ratio of the elution amount at 50° C." is a ratio (mass %) of the elution amount of a component eluted at 50° C. with respect to the total of the elution amount of the component eluted at 50° C. and the elution amount of the component eluted at 140° C.

In case of a composition including the propylene polymer and the ethylene-α-olefin copolymer, the components eluting at 50° C. correspond substantially to the ethylene-α-olefin copolymer, and the components eluting at 140° C. correspond substantially to the propylene polymer.

In case where the propylene polymer and the ethylene-α-olefin copolymer constituting the propylene polymer composition are the ethylene-propylene block copolymer, the ethylene-propylene block copolymer may be produced by the following method by using a polymerization catalyst, for example.

Examples of the polymerization catalyst(s) include a Ziegler catalyst system, a Ziegler-Natta catalyst system, a catalyst system including a transition metal compound of Group 4 element with a cyclopentadienyl ring and an alkyl aluminoxane, a catalyst system including a transition metal compound of Group 4 element with a cyclopentadienyl ring, a compound reactive with the transition metal compound of Group 4 element to thereby form an ionic complex, and an organic aluminum compound, a catalyst system including a catalyst component such as the transition metal compound of Group 4 element with a cyclopentadienyl ring, a compound forming an ionic complex, and an organic aluminum compound, carried and modified on inorganic particles such silica and clay mineral, and the like catalysts. Moreover, preliminary polymerization catalyst may be used, which is prepared by performing preliminary polymerization of ethylene or α-olefin under the catalyst system.

Examples of the catalyst include the catalyst systems described in JP-A-61-218606, JP-A-5-194685, JP-A-7-216017, JP-A-9-316147, JP-A-10-212319, and JP-A-2004-182981.

Examples of a polymerization method include bulk polymerization, solution polymerization, slurry polymerization, and gas phase polymerization. Here, the bulk polymerization is a method in which polymerization is carried out at a polymerization temperature with a liquid olefin as a medium, whereas the solution polymerization and slurry polymerization are method in which polymerization is carried out in an inert hydrocarbon solvent such as propane, butane, isobutane, pentane, hexane, heptane, and octane. Moreover, the gas phase polymerization is a method in which a monomer in gas state is used as a medium and is polymerized in the medium.

The aforementioned polymerization methods may be carried out batch-wise or via multi-stages of a plurality of polymerization vessels connected in series, and the aforementioned polymerization methods may be combined arbitrarily. For the sake of industrial and economic advantages, the polymerization method may be preferably continuous gas phase polymerization or bulk-gas phase polymerization in which bulk polymerization and the gas phase polymerization are continuously carried out.

Note that various conditions at a polymerization step (polymerization temperature, polymerization pressure, monomer concentration, catalyst amount added, polymerization duration, and the like) are decided as appropriate according to a targeted propylene polymer composition.

In order to remove residue solvent contained in the polymer, ultra-low molecular weight oligomers by-produced in the production, and the like, the propylene polymer composition may be dried at a temperature lower than a melting temperature of the propylene polymer composition. Examples of a drying method include the methods described in JP-A-55-75410, and JP-B-2565753, and the like methods.

A limiting viscosity ($[\eta]$I) of the propylene polymer measured in tetralin of 135° C. may be preferably in a range of 0.1 to 5 dl/g, more preferably in a range of 0.3 to 4 dl/g, or further preferably in a range of 0.5 to 3 dl/g.

A limiting viscosity ($[\eta]$II) of the ethylene-α-olefin copolymer measured in tetralin of 135° C. may be preferably in a range of 0.5 to 20 dl/g, more preferably in a range of 0.6 to 10 dl/g, or further preferably in a range of 0.7 to 7 dl/g.

In case where one kind of the ethylene-α-olefin copolymer contained in the propylene polymer composition is the ethylene-propylene copolymer, a limiting viscosity ($[\eta]$II) thereof is preferably 2.9 dl/g or more for the sake of low gloss.

Moreover, a ratio ($[\eta]$II/$[\eta]$I) of the limiting viscosity ($[\eta]$II) of the ethylene-α-olefin copolymer with respect to the limiting viscosity ($[\eta]$I) of the propylene polymer may be preferably in a range of 0.1 to 20, more preferably in a range of 0.1 to 10, or further preferably in a range of 0.1 to 9.

The limiting viscosity (unit: dl/g) is a value measured at a temperature of 135° C. by the following method, using tetralin as a solvent.

By using an Ubbelohde viscometer, reduced viscosities at three points of concentrations of 0.1 g/dL, 0.2 g/dL, and 0.5 g/dL are measured. The limiting viscosity was worked out by the calculation method described on "Polymer Solution, Polymer Experiment 11" (Kobunshi Yoeki, Kobunshi Jikkengaku 11) (published in 1982, KYORITSU SHUPPAN CO., LTD.), page 491, that is, an extrapolation method including plotting the reduced viscosities against the concentration and performing extrapolation of the concentrations to zero.

In case where the propylene polymer composition according to the present invention includes the ethylene-propylene block copolymer obtained by multi-staged polymerization of the propylene polymer and the ethylene-α-olefin copolymer, the limiting viscosity of the propylene polymer in the ethylene-propylene block copolymer and the limiting viscosity of the ethylene-α-olefin copolymer are worked out by the following method. From polymer powder sampled from a polymerization vessel of a preceding stage of the multi-staged polymerization, the limiting viscosity of the propylene polymer or the ethylene-α-olefin copolymer is worked out and the limiting viscosity of the remaining polymer is worked out by using the value of the limiting viscosity and the contents of the components.

The ethylene content (($C2'$)II) of the ethylene-α-olefin copolymer in the propylene polymer composition is worked out by measuring the ethylene contents (($C2'$)Total) of the whole propylene polymer composition by the infrared absorption spectrum method, and performing calculation using the following equation.

$$(C2')\text{II}=(C2')\text{Total}/X\text{II}$$

($C2'$)Total: Ethylene contents of the whole propylene polymer composition (mass %)
($C2'$)II: Ethylene content of ethylene-α-olefin copolymer (mass %)
XII; A weight ratio of the ethylene-α-olefin copolymer with respect to the propylene polymer composition (mass %)

For example, the propylene polymer composition satisfying the requirement (I) may be obtained by a method comprising melt-kneading the propylene polymer, the ethylene-α-olefin copolymer, and a certain cross-linking agent. The step forms a cross-linking structure between part of the propylene polymer and part of the ethylene-α-olefin copolymer. It is deduced that the propylene polymer composition satisfies the requirement (I) by containing a component in which the cross-linking structure is formed.

Examples of the cross-linking agent include compounds such as diphenyl fulvene (CAS No. 2175-90-8), 2-(2-furyl)methylene)Malononitrile (CAS No. 3237-22-7), TEMPO-methacrylate (CAS No. 15051-46-4), phenothiazine (CAS No.: 92-84-2), benzophenone (CAS No. 119-61-9), 1,2,3,6,7,8,9,10,11,12-decahydrobenzopyrene (CAS No. 92387-50-3), S-1-octadecyl-S'-(α,α'-dimethyl-α"-acetylate)-trithiocarbonate, 1,1,1-tris[(dodecylthiocarbonothioylthio)-2-methylpropyonate]ethane, 2-(dodecylthiocarbonothioylthio)-2-methyl propyonate, benzyl 1H-pyrrole-1-carbodithionate, 1-(methoxycarbonyl)ethyl benzothionate, S-1-dodecyl-S'-(α,α'-dimethyl-α"-acetate)-trithiocarbonate, methyl (tert-butoxy carbonothioyl) sulfanyl acetate, and the like, and it is preferable to select and use one or more kinds of these compounds. In order to improve the cross-linking effect, it is more preferable to use a combination of one or more kinds of compounds selected from the group consisting of 2-(2-furylmethylene)Malononitrile (CAS No. 3237-22-7), TEMPO-methacrylate (CAS No. 15051-46-4), phenothiazine (CAS No.: 92-84-2), benzophenone CAS No. 119-61-9), 1,2,3,6,7,8,9,10,11,12-decahydrobenzopyrene (CAS No. 92387-50-3), and S-1-octadecyl-S'-(α,α'-dimethyl-α"-acetylate)-trithiocarbonate, and diphenyl fulvene (CAS No. 2175-90-8). It is further preferable to use a combination of one or more kinds of compounds selected from the group consisting of 2-(2-furylmethylene)Malononitrile (CAS No. 3237-22-7), TEMPO-methacrylate (CAS No. 15051-46-4), phenothiazine (CAS No.: 92-84-2), benzophenone CAS No. 119-61-9), and 1,2,3,6,7,8,9,10,11,12-decahydrobenzopyrene (CAS No. 92387-50-3), and diphenyl fulvene (CAS No. 2175-90-8).

The cross-linking agent may be preferably used in combination with any one or more of organic peroxides.

More specific examples of the organic peroxide include at least one kind of compounds selected from the group consisting of alkyl peroxide compounds, diacyl peroxide compounds, compounds (b1) having a structure represented by the following structural formula (1), and compounds (b2) having a structure represented by the following structural formula (2).

[Chem. 1]

Examples of the alkyl peroxide compounds include dicumyl peroxide, di-tert-butyl peroxide, tert-butyl cumyl peroxide, 2,5-dimethyl-2,5-di(tert-butyl peroxy)hexane, 2,5-dimethyl-2,5-di(tert-butyl peroxy)hexyne-3, 1,3-bis(tert-butyl peroxy isopropyl)benzene, 3,6,9-triethyl-3,6,9-trimethyl-1,4,7-triperoxonane, and the like.

Examples of the diacyl peroxide compounds include dibenzoyl peroxide, diisobutyryl peroxide, di(3,5,5-trimethylhexanoyl) peroxide, di(4-methylbenzoyl)peroxide, didodecanoyl peroxide, and the like.

Examples of the compounds (b1) having a structure represented by the following structural formula (1) include dicetyl peroxydicarbonate, di-3-methoxy butyl peroxydicarbonate, di-2-ethylhexyl peroxydicarbonate, bis(4-tert-butylcyclohexyl)peroxydicarbonate, diisopropyl peroxydicarbonate, tert-butyl peroxyisopropyl carbonate, dimyristyl peroxycarbonate, and the like.

Examples of the compounds (b2) having a structure represented by the following structural formula (2) include 1,1,3,3-tetramethylbutyl neodecanoate, α-cumyl peroxy neodecanoate, tert-butyl peroxy neodecanoate, and the like.

The propylene polymer composition according to the present invention may include the other resin, an inorganic filler, an organic filler, or additive, provided that the propylene polymer composition satisfies the requirement (I).

Examples of the other resin that may be included in the propylene polymer composition according to the present invention include thermoplastic resins such as polystyrene resin, ABS (acrylonitrile/butadiene/styrene copolymer) resin, AAS (special acrylic rubber/acrylonitrile/styrene copolymer) resin, ACS (acrylonitrile, chlorinated polyethylene/styrene copolymer) resin, polychloroprene, chlorinated rubber, polyvinyl chloride, polyvinylidene chloride, acrylic resin, ethylene/vinyl alcohol copolymer resin, fluorocarbon resin, polyacetal, polyphenylene ether resin, polyurethane, polyamides, polyester resin, polycarbonate, polysulfone, polyether ether ketones, polyether sulfone, aromatic polyester resin, and polyethylene, epoxy resin, dially phthalate prepolymer, silicone rubber, polybutadiene, 1,2-polybutadiene, polyisoprene, styrene/butadiene copolymer, butadiene/acrylonitrile copolymer, epichlorohydrin rubber, acryl rubber, and natural rubber, and the like.

The propylene polymer composition according to the present invention may contain a polymer produced by polymerizing a plant-derived monomer extracted from a bio material. Examples of such a polymer include poly lactic resin (PLA resin), PBT resin, and the like.

Examples of the inorganic filler include non-fibrous inorganic fillers and fibrous inorganic fillers. Examples of the non-fibrous inorganic fillers include talc, mica, calcium carbonate, barium sulfate, magnesium carbonate, clay, alumina, silica, calcium sulfate, silver sand, carbon black, titanium oxide, magnesium hydroxide, zeolite, molybdenum, diatomite, sericite, shirasu (white sand), calcium hydroxide, calcium sulfite, sodium sulfate, bentonite, graphite, and the like. The additive may be used solely or two or more of the additives may be used in combination. Among them, talc is preferable.

The non-fibrous inorganic fillers may be used as such without treatment. Moreover, in order to improve interface bonding ability with the propylene polymer composition according to the present invention and improve dispersiveness in the propylene polymer composition, the non-fibrous inorganic fillers may be surface-treated with a silane-coupling agent or a titanium-coupling agent, or a surfactant. Examples of the surfactant include a higher fatty acids, higher fatty acid esters, higher fatty acid amides, higher fatty acid salts, and the like.

An average particle size of the non-fibrous inorganic fillers is 10 μm or less, or preferably 5 μm or less. Here, the "average particle size" in the present invention is particle diameter D50 corresponding a cumulative 50% point of diameter, which is worked out from an integral distribution curve measure by a sieving method in which the non-fibrous inorganic filler is dispensed in a dispersion medium such as water or alcohol by using a centrifugal precipitating particle size distribution measuring device.

Examples of forms of the non-fibrous inorganic fillers include powder, flacks, granule, and the like.

Examples of the fibrous inorganic fillers include fibrous magnesium oxysulfate, potassium titanate fibers, magnesium hydroxide fibers, aluminum borate fibers, calcium silicate fibers, calcium carbonate fibers, carbon fibers, glass fibers, metal fibers, and the like. The additive may be used solely or two or more of the additives may be used in combination. Among them, it is preferable to use fibrous magnesium oxysulfate or calcium silicate fibers, and it is more preferable to use fibrous magnesium oxysulfate.

The fibrous inorganic fillers may be used as such without treatment. In order to improve interface bonding ability with the propylene polymer composition according to the present invention and improve dispersiveness in the propylene polymer composition, the non-fibrous inorganic fillers may be used with surface-treatment with a silane-coupling agent or a higher fatty acid metal salt. Examples of the higher fatty acid metal salt include calcium stearate, magnesium stearate, zinc stearate, and the like.

An average fiber length of the fibrous inorganic fillers measured by electron-microscopy observation may be preferably 3 µm or more, more preferably in a range of 3 µm to 20 µm, or further preferably in a range of 8 µm to 15 µm. The aspect ratio may be preferably 10, more preferably in a range of 10 to 30, or further preferably in a range of 12 to 25. An average fiber diameter of the fibrous inorganic fillers measured by electron-microscopy observation may be preferably in a range of 0.01 µm to 1.5 µm, or more preferably in a range of 0.2 µm to 1.0 µm.

Examples of the organic fillers include natural fibers such as lignin, starch, wood powder, wood fibers, bamboo, raw cotton, cellulose, cellulose nano crystal, nano cellulose fibers.

The propylene polymer composition according to the present invention may include an additive. Examples of the additive include neutralizers, anti-oxidants, ultraviolet absorbing agent, hindered amine light resistant agents, lubricants, anti-static agents, metal deactivators, anti-blocking agents, processing aids, colorants, foaming agents, foaming nucleating agents, plasticizers, flame retardants, cross-linking aids, luminance improvers, anti-microbial agents, light diffusing agents, and the like. The aforementioned additive may be used solely or two or more of the additive may be used in combination.

A preferably producing method for the propylene polymer composition is a method including melt-kneading the propylene polymer, the ethylene-α-olefin copolymer, and a cross-linking agent. More preferable producing method is a method comprising a step of obtaining a composition precursor by melt-kneading the propylene polymer and the ethylene-α-olefin copolymer together, and a step of obtaining the propylene polymer composition by melt-kneading the composition precursor and the cross-linking agent together. In the step of obtaining the composition precursor, at least one kind of materials selected from the group consisting of an organic peroxide, an additive, another resin, an inorganic filler, and an organic filler may be melt-kneaded together with the propylene polymer and the ethylene-α-olefin copolymer, if necessary.

The composition precursor may be pelleted before use. In the case of the method comprising a step of obtaining a composition precursor by melt-kneading the propylene polymer and the ethylene-α-olefin copolymer together, and a step of obtaining the propylene polymer composition by melt-kneading the composition precursor and the cross-linking agent together, the method may be such that the composition precursor is not pelleted and the cross-linking agent is added directly into the composition precursor melted in a melt-kneading device, or the method may be such that the composition precursor and the cross-linking agent are pelleted and introduced into the melt-kneading device again so as to melt-knead the composition precursor and the cross-linking agent together. In case where the composition precursor and the cross-linking agent thus pelleted are melt-kneaded, it is preferable that the composition precursor and the cross-linking agent are mixed in a mixer in advance, so that the composition precursor and the cross-linking agent will have uniformly mixed.

The melt-kneading may be carried out with a Banbury mixer, single-screw extruder, twin-screw extruder, or the like, and may employ two or more extruders. For the sake of improving productivities, the twin-screw extruder is preferable.

For the sake of flowability and impact strength of the composition thus obtained, a setting temperature of the extruder for the melt-kneading is 150° C. or more, preferably in a range of 160° C. to 300° C., more preferably in a range of 170° C. to 250° C., or further preferably in a range of 190° C. to 230° C.

The melt-kneading may be carried out with inert gas such as nitrogen flowing through the extruder, so as to adjust oxygen concentration. By increasing the flow rate of the inert gas so as to lower the oxygen concentration, it is possible to alleviate deterioration of toughness such as tensile elongation of the molded article formed from the propylene polymer composition. Moreover, by reducing the flow rate of the inert gas or not flowing the inert gas, it is possible to adjust the oxygen concentration to an oxygen concentration similar to the atmosphere. With this method, a flow length (SPF) can be longer, so that actual flowability inside a molding device can be improved.

An oxygen concentration at a feed hopper section of the extruder for melt-kneading is 0% or more, but 21% or less.

The propylene polymer composition according to the present invention can be molded by injection molding, blow molding, sheet molding, laminate molding, or foaming molding, thereby obtaining a molded article. The molded article thus obtained is low in gloss and excellent in impact strength.

Examples of applications of the molded article include automobile materials, home appliance materials, building materials, bottles, containers, sheets, and films. Preferable applications include automobile interior parts, home appliance materials, building materials (especially for products present in living space of people).

Examples of the automobile materials include: interior parts such as door trims, pillars, instrumental panels, consoles, rocker panels, arm rests, door panels, and spear tire covers; exterior parts such as bumpers, spoilers, fenders, and side steps; parts such as air intake ducts, coolant reserve tanks, fender liners, fans, and under deflectors; and integrated molded parts such as front end panel.

Moreover, examples of the home appliance materials include washing machine materials (outer tank), drying machine materials, vacuum cleaner materials, rice cooker materials, electric kettle materials, warmer materials, dish washer materials, air cleaner materials, air conditioner materials, and lighting equipment materials.

Moreover, examples of the building materials include floor members, wall members, window members.

EXAMPLES

Hereinafter, the present invention will be described with reference to Examples and Comparative Examples. Components used in Examples and Comparative Examples are listed below.

(1-1) Propylene-Ethylene Block Copolymer (A-1-1)

Using a polymer catalyst obtained by the method descried in Example 1 of JP-A-2004-182981, a liquid phase-gas phase polymerization was conducted to produce a propylene-ethylene block copolymer (A-1-1) with propylene homopolymer component of 89 parts by mass as the propylene polymer, and ethylene-propylene random copolymer component of 11 parts by mass as the ethylene-α-olefin copolymer. Properties thereof were as below.

Melt flow rate (230° C., under load of 2.16 kg): 98 g/10 min
(a) Propylene Homopolymer Component (P Fraction):
Limiting viscosity: 0.79 dl/g
(b) Ethylene-Propylene Random Copolymer (EP Fraction):
Limiting viscosity: 7.0 dl/g
Content of ethylene-derived structural unit: 32 mass %

(1-2) Propylene-Ethylene Block Copolymer (A-1-2)

Using a polymer catalyst obtained by the method descried in Example 1 of JP-A-2004-182981, a liquid phase-gas phase polymerization was conducted to produce a propylene-ethylene block copolymer (A-1-2) with propylene homopolymer component of 83 parts by mass as the propylene polymer, and ethylene-propylene random copolymer component of 17 parts by mass as the ethylene-α-olefin copolymer. Properties thereof were as below.

Melt flow rate (230° C., under load of 2.16 kg): 24 g/10 min
(a) Propylene Homopolymer Component (P Fraction):
Limiting viscosity: 1.1 dl/g
(b) Ethylene-Propylene Random Copolymer (EP Fraction):
Limiting viscosity: 3.9 dl/g
Content of ethylene-derived structural unit: 55 mass %

(2-1) Ethylene-α-Olefin Copolymer (B')

Excelleno FX555 available from Sumitomo Chemical Co., Ltd. was used. Properties thereof were as below.
Ethylene-Butene-1 Copolymer
Content of ethylene-derived structural unit 76 mass % (content of structural unit derived from butene-1: 24 mass %)
Limiting viscosity: 1.2 dl/g (3) Other Components 1. Cross-linking agent DeltaMax™ i300 (Milliken)
DeltaMax™ i300 contains diphenylfulvene, phenothiazine, and an organic peroxide as components functioning as cross-linking agents.

2. Cross-linking agent DeltaMax™ a200 (Milliken)
DeltaMax™ a200 contains diphenylfulvene, benzophenone, and an organic peroxide as components functioning as cross-linking agents.

3. Cross-linking agent DeltaMax™ m100 (Milliken)
DeltaMax™ m100 contains diphenylfulvene, and an organic peroxide as components functioning as cross-linking agents.

4. Styrene-ethylene/butylene-styrene block copolymer (SEBS)
KRATONR® G 1657 (KRATON)

5. INTUNEF, D5535 (Dow Chemical Company)

6. Organic peroxide master batch
An organic peroxide master batch including bis(tert-butylperoxyisopropyl)benzene by 8 mass % and polypropylene by 92 masse.

Various properties were measured by the following methods.

(1) Gloss Measurement (%)
A molded article was stood still under standard conditions with a room temperature of 23° C. and a humidity of 50% for 48 hours, and gloss was measured at a mirror surface at an angle of 60° by using a micro-tri-gloss (handheld-type gloss meter, BYK-Gardner). A smaller value of gloss means lower gloss.

(2) Flow Length Measurement (SPF, Unit Mm)
Using an injection molding device SE130D (Sumitomo Heavy Industries, Ltd.), injection molding was conducted with a molding temperature of 200° C., a molding cooling temperature of 50° C., a pressure of 80 MPa, and a spiral molding of 2 mm in thickness, and a flow length of a resin flowing in the mold was measured. A greater flow length means a higher flowability.

(3) Izod Impact Strength Measuring Method (Izod, Unit: kJ/m2)
Using an injection molding device IS100 (Toshiba Corporation), injection molding was conducted with a molding temperature of 220° C., a molding cooling temperature of 50° C., so as to produce an Izod impact test piece of 12.7 mm in width, 63.5 mm in length, and 3.2 mm in thickness by molding. The test piece was notched to produce a V-shaped notch (A type) as instructed in JIS K7110, and Izod impact test was conducted with the V-notched test piece according to JIS K7110 after the conditions were adjusted to 23° C., thereby measuring the Izod impact strength.

(5) Measuring Method for Difference a Between Die Swell Ratios (Unit -)
Using Capilograph 1D (Toyo Seiki Kogyo Co. Ltd.) having capillary diameter of 1 mm, a capillary length of 40 mm, and L/D=40, the melted composition was extruded from the outlet of the capillary at a test temperature of 200° C. at a shear rate of 24 $\sec^{-1}$ (a falling rate of a piston: 2 mm/min) and at a shear rate of 6080 $\sec^{-1}$ (a falling rate of a piston: 500 mm/min), thereby preparing a strand. A diameter of the strand at 12 mm from an outlet of the capillary downwardly in a perpendicular direction was measured by using laser. The die swell ratios at these shear rates are represented by the following equation.

$$\text{die swell ratio} = \text{Diameter of Strand (mm)}/\text{Diameter of Capillary (mm)}$$

After the die swell ratios at these shear rates are obtained, the absolute value of the difference between the die swell ratio at the shear rate of 24 $\sec^{-1}$ and the die swell ratio at the shear rate of 6,080 $\sec^{-1}$ was calculated out.

That is, an absolute value G of the difference of die swell ratios is represented by the following equation.

$$\Delta = |(\text{die swell ratio shear rate of 6080 } \sec^{-1}) - (\text{die swell ratio shear rate of 24 } \sec^{-1})|$$

Figure 1:
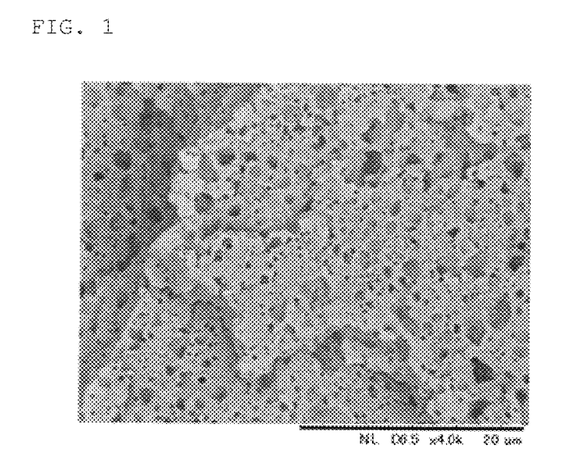
FIG. 1 is an SEM image of a broken surface of a test piece of Example 1.
Figure 2:
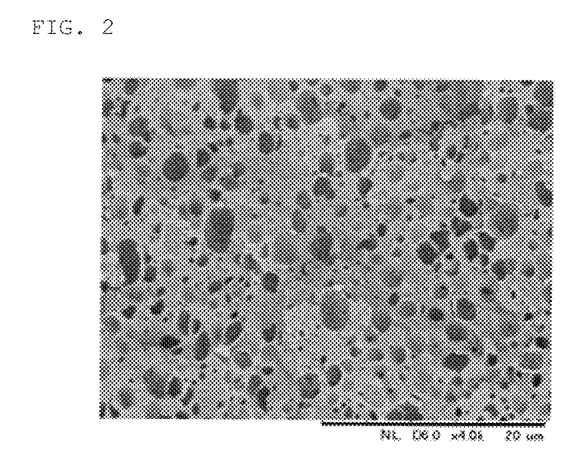
FIG. 2 is an SEM image of a broken surface of a test piece of Comparative Example 4.

(6) Scanning Electron Microscope (SEM) Measurement
For Example 1 and Comparative Example 4, broken surfaces of the test pieces after the Izod impact tests were observed by scanning electron microscope (SEM). The broken test piece was introduced in 100 ml of chloroform and washed by an ultrasonic washing device for 5 min, and then transferred to 100 ml of ion exchanged water and washed by the ultrasonic washing device for 5 min. After that, the test pieces was again washed in 100 ml of chloroform by the ultrasonic washing device for 1 min, and further washed in 100 ml of ion exchanged water by the ultrasonic washing device for 1 min. This removed rubber domain portions therefrom. The test piece was blow-dried and then subjected to gold vapor deposition. The broken surface of the test piece subjected to the gold vapor deposition was observed by the SEM with 4000× magnification. An observation image of Example 1 is illustrated in FIG. 1, while an observation image of Comparative Example 4 is illustrated in FIG. 2. The images thus obtained were subjected to particle analysis by image analysis software (A-zo-kun®, Asahi Kasei Engineering Corporation), thereby working out a number average equivalent circle diameter of a spherical space portion after the removal of the rubber portion.

(7) Fractional Extraction Method for Ortho-Dichlorobenzene-Insoluble Fraction

The ortho-dichlorobenzene-insoluble fraction of the samples was obtained by an automatic extractor. Into a dissolving vessel of an automatic extractor, 1 g of a sample was added and 200 ml of ortho-dichlorobenzene containing dibutyl hydroxy toluene by 0.05 mass % was added and stirred under heating at 140° C. for 90 min, thereby preparing a solution with a concentration of 5.0 mg/ml. Next, the sample solution was cooled down to 120° C. at a rate of 20° C./min, and maintained at 120° C. for 45 min. Next, the sample solution was cooled down to 50° C. at a rate of 2° C./min, and maintained at 50° C. for 60 min, thereby precipitating the ortho-dichlorobenzene-insoluble fraction. Next, after a solution of an ortho-dichlorobenzene-soluble fraction in the sample was discharged out of the dissolving vessel, 200 ml of ortho-dichlorobenzene is newly added in the dissolving vessel, and a mixture thus obtained was stirred under heading at 140° C. for 60 min, thereby dissolving the ortho-dichlorobenzene-insoluble fraction. Next, a solution of the ortho-dichlorobenzene-insoluble fraction in the sample was discharged out of the dissolving vessel. After the solution thus discharged is stood still for one night, the solution is charged to 1000 ml of methanol. Precipitates thus obtained was filtered by suction filtration via a PTFE membrane with a pore diameter of 10 μm, washed with about 200 ml of methanol, subjected to suction filtration for removing excess methanol attached thereto, and transferred to an evaporating dish. While blowing nitrogen gas to the precipitates over the evaporating dish, the precipitates were dried with a water bath at 60° C. for 4 hours, and in a vacuum dryer at 60° C. for 4 hours. A solid thus obtained was taken as the ortho-dichlorobenzene-insoluble fraction of the sample.

<Devices, Solvent, and Sample Solution Concentration>
Device: Automatic extractor PREP-mc2 (Polymer ChAR)
Solvent: ortho-dichlorobenzene containing dibutyl hydroxy toluene by 0.05 mass %
(Wako, Special Grade)
Sample Solution Concentration: 5.0 mg/ml (8) Ethylene Triad Chains (EEE) Content and Ethylene Content in the Ortho-Dichlorobenzene-Insoluble Fraction Measuring Method An ethylene triad chains (EEE) fraction and the ethylene content in the ortho-dichlorobenzene-insoluble fraction of the samples are worked out by measuring carbon nuclear magnetic resonance spectrum ($^{13}$C-NMR) by a carbon nuclear magnetic resonance method under the following measurement conditions, and working out the fraction according to the method of Kakugo et al. described in Macromolecules (1982, 15th vol., pages 1150 to 1152) on the basis of the result of the measurement.

<Measurement Conditions>
Device: AVANCE600 (Bruker)
Measurement Solvent: 1,1,2,2-tetrachloroethane-d2
Measurement temperature: 135° C.
Measurement method: proton decoupling method
Pulse width: 45 degrees
Pulse repetition time: 4 seconds
Measurement shift reference value: tetramethylsilane
Accumulation amount: 5000 times or more (9) Measurement Method for Degree of Cross-Linking Parameter by GPC
(3D-GPC)

The degree of cross-linking parameter of the samples was measured by a gel permeation chromatograph (GPC) provided with a differential refractive index detector, a viscosity detector and a light scattering detector.

As a GPC provided with a differential refractive index detector (RI), HLC-8121GPC/HT (Tosoh Corporation) was used. Moreover, the GPC device was connected with PD2040 (Precision Detectors) as the light scattering detector (LS). A scattering angle used for the light scattering detection was 90°. Moreover, the GPC device was connected with H502 (Viscotek) as the viscosity detector (VISC). The LS and VISC were placed inside the column oven of the GPC device, and connected in such a way that the LS, RI, VISC were connected in this order. For calibration for the LS and VISC and for correction of capacity lag between the detectors, Polycal TDS-PS-N (with weight average molecular weight Mw of 104,349 and polydispersity of 1.04), which is a polystyrene control material of Malvern, was used with a solution concentration of 1 mg/ml. A mobile phase and a solvent therefor were ortho-dichlorobenzene to which dibutyl hydroxy toluene was added by a concentration of 0.5 mg/mL as a stabilizer. Melting conditions of the samples were stirring at 145° C. for 2 hours. A flow rate was 1 ml/min. A column thereof was 3 columns of GMHHR-H(S) HT (Tosoh Corporation) connected in series. Temperatures at the column, a sample injecting section, and each detector were 140° C. Sample Solution Concentration was 2 mg/mL. An injection amount of the sample solution (sample loop capacity) was 0.3 ml. Refractive index incremental (dn/dc) in ortho-dichlorobenzene in the samples was −0.078 ml/g. Polystyrene control's dn/dc was 0.079 ml/g. In determining the absolute molecular weight and the intrinsic viscosity ([η]sample; unit dl/g) from data acquired with the detectors, calculation was made by using the data processing software OmniSEC (version 4.7) from Malvern Instruments Limited referring to the literature "Size Exclusion Chromatography, Springer (1999)". Note that the Refractive index incremental is a change ratio of refractive index with respect to a change of concentration.

(Calculation of Degree of Cross-Linking Parameter)

The degree of cross-linking parameter was calculated out from the following equations with the intrinsic viscosity $([\eta]_{M,sample})$ obtained by measuring the samples with the device and intrinsic viscosity $([\eta]_{M,PP})$ of a linear polypropylene.

$$\text{A degree of cross-linking parameter} = \frac{\int_{100,000}^{1,000,000} \{w_M \times g'_M\} dM}{\int_{100,000}^{1,000,000} w_M dM}$$

Here, M is the absolute molecular weight and $w_M$ is a weight fraction of a component with an absolute molecular weight M in the sample. $g'_M$ is a ratio of the intrinsic viscosity of the sample with respect to the intrinsic viscosity of the linear polypropylene in case where the absolute molecular weight of the sample is identical with the absolute molecular weight of the linear polypropylene. That is, $g'_M = [\eta]_{M,sample}/[\eta]_{M,PP}$. $[\eta]_{M,PP}$ of the linear polypropylene was calculated by the following equation recited in "Size Exclusion Chromatography, Springer (1999)."

$$[\eta]_{M,PP}=0.000242 \times M^{0.707} \text{ (dl/g)}$$

<Measurement Conditions>
GPC Device: HLC-8121GPC/HT (Tosoh Corporation)
Light scattering detector: Precision Detector PD2040
Differential pressure viscometer: Viscotek H502
GPC Column: GMHHR-H(S)HT×3 columns (Tosoh Corporation)
Sample Solution Concentration: 2 mg/ml
Injection Amount: 0.3 ml
Measurement temperature: 140° C.
Dissolving Conditions: stirring at 145° C. for 2 hours
Solvent and mobile phase: ortho-dichlorobenzene containing dibutyl hydroxy toluene by 0.05 masse (Wako, special grade)
Mobile phase flow rate: 1 mL/min
Measurement time: about 1 hour (10) Measurement of Ratio of Elution Amounts at 50° C. by CFC The ratio was measured by using cross fractionation chromatograph (CFC). To 20 mg of the sample, 20 ml of ortho-dichlorobenzene containing BHT by 0.05 w/V % was added, and a mixture thus formed was stirred at 145° C. for 60 min, thereby preparing a sample solution. The sample solution was injected by 0.5 ml into a temperature rising elution fractionation (TREF) column maintained at 145° C. in CFC device and kept as such for 20 min. Next, the temperature of the TREF column was cooled down to 100° C. at a rate of 20° C./min, and kept at 100° C. for 20 min. Next, the temperature of the TREF column was cooled down to 30° C. at a rate of 2° C./min, and kept at 30° C. for 30 min. Next, the temperature of the TREF column was increased to 50° C. at a rate of 20° C./min and held to 50° C. for about 19 min. Then, the elution amounts of the components eluted at 50° C. were measured by the gel permeation chromatograph (GPC; provided in the CFC) provided with an infrared spectrometer. Then, the temperature of the TREF column was increased to 140° C. at a rate of 20° C./min and held at 140° C. for about 19 min. After that, an elution amounts of the components eluted at 140° C. were measured by using the gel permeation chromatograph (GPC; provided in the CFC) with the infrared spectrometer. The "ratio of the elution amount at 50° C." was calculated as a ratio (mass %) of the elution amount of a component eluted at 50° C. with respect to the total of the elution amount of the component eluted at 50° C. and the elution amount of the component eluted at 140° C.

(CFC Measurement Conditions)
CFC Device: Automated 3D analyzer CFC-2 (Polymer ChAR)
TREF column: Stainless steel micro ball-filled column (3/8" o.d×150 mm) (Polymer ChAR)
Solvent and mobile phase: ortho-dichlorobenzene containing dibutyl hydroxy toluene by 0.05 masse (Wako, special grade)
Sample Solution Concentration: prepared by adding 20 ml of solvent in 20 mg of the sample.
Dissolving Conditions: stirring at 145° C. for 60 minutes
Injection amount into the TREF column: 0.5 ml
GPC Column: GMHHR-H(S)HT×3 columns (Tosoh Corporation)
Mobile phase flow rate: 1.0 ml/min
Detector: Infrared Spectrometer IR5 (Polymer ChAR; provided in the CFC device)
Measurement time: about 4 hours
Calibration for the GPC column: Combinations of 5 mg of polystyrene controls produced by Tosoh Corporation were weighed as listed below, and 20 ml of the solvent was added in each combination and dissolved at 145° C. for 1 hour, thereby preparing solutions. Each solution was analyzed by GPC analysis and a calibration curve was prepared from relationship between molecular weight and peak top elution time of each polystyrene control. The calibration was carried out based on the calibration curve.

| | |
|---|---|
| Polystyrene control combination 1 | F850, F80, F1 |
| Polystyrene control combination 2 | F288, F10, A2500 |
| Polystyrene control combination 3 | F80, F4, A1000 |
| Polystyrene control combination 4 | F40, F2, A500 |

Example 1

Weighing was carried out to weigh 77 parts by mass of propylene-ethylene block copolymer (A-1-1), 23 parts by mass of ethylene-α-olefin copolymer (B'), and 0.06 parts by mass of the organic peroxide master batch, and they are mixed uniformly and introduced into a raw material feeding inlet of an upmost stream side of a twin-screw extruder TEX44αII (Japan Steel Works, Ltd.), and melt-kneading were carried out with a cylinder temperature of 230° C., discharging amount of 50 kg/hour, a screw speed of 200 rpm, and an oxygen concentration of 2% at the feed hopper section, thereby preparing pellets (a1). Note that the oxygen concentration of the feed hopper section was measured with a sensor of an oxygen concentration detector, the sensor being provided at a purge resin feeding inlet associated with the feed hopper section. Moreover, the oxygen concentration of 2% was realized by flowing the nitrogen gas to the feed hopper section.

Next, after uniformly mixing 100 parts by mass of the pellet (a1) and 2 parts by mass of DeltaMax™ i300 (Milliken) to obtain a mixture, and the mixture was again introduced into a raw material feeding inlet of the upmost stream side of the twin-screw extruder TEX44αII (Japan Steel Works, Ltd.), and melt-kneading were carried out with a cylinder temperature of 230° C., discharging amount of 50 kg/hour, a screw speed of 200 rpm, and an oxygen concentration of 2% at the feed hopper section, thereby preparing pellets (b1).

One hundred parts by mass of the pellet (b1) and 3 parts by mass of black pigment master batch (BP-8993D-30, Nippon Pigment Company Limited) were mixed to obtain a mixture. The mixture was introduced into a feeder of an injection molding device (Mold injector SE180D (Sumitomo Heavy Industries, Ltd.) for injection molding carried out with a molding temperature of 220° C. and a molding cooling temperature of 50° C., so as to obtain a molded article of a rectangular shape of 400 mm in length, 100 mm in width, and 3 mm in thickness. The mold of the injection molding device had an embossing pattern on one side and a mirror surface on the other side. Gloss of the mirror surface of the molded article thus obtained was measured.

Moreover, using the pellet (b1) thus obtained, the die swell ratio, the flow length, the Izod impact strength, the bending elastic module, the ethylene triad chains (EEE) in the ortho-dichlorobenzene-insoluble fraction, the ethylene content in the ortho-dichlorobenzene-insoluble fraction, and the degree of cross-linking parameter were measured.

Results thereof are shown on Table 1. Moreover, the SEM image of the broken cross-section after the Izod impact test is illustrated in FIG. 1. Worked out from the SEM image, the number average equivalent circle diameter of a rubber domain in the broken surface of the test piece after the Izod impact test was 0.54 μm.

Example 2

A molded article was prepared as in Example 1, except that DeltaMax™ i300 was replaced with DeltaMax™ a200. Results thereof are shown on Table 1.

Example 3

Weighing was carried out to weigh 77 parts by mass of propylene-ethylene block copolymer (A-1-1), 23 parts by mass of ethylene-α-olefin copolymer (B'), and 2 parts by mass of the DeltaMax™ i300 (Milliken), and they are mixed uniformly and introduced into a raw material feeding inlet of an upmost stream side of a twin-screw extruder TEX44αII (Japan Steel Works, Ltd.), and melt-kneading were carried out with a cylinder temperature of 230° C., discharging amount of 50 kg/hour, a screw speed of 200 rpm, and an oxygen concentration of 2% at the feed hopper section, thereby preparing pellets (a3).

Using a mixture of 100 parts by mass of the pellet (a3) and 3 parts by mass of black pigment master batch (BP-8993D-30, Nippon Pigment Company Limited), the injection molding was carried out and gloss of the mirror surface of the molded article thus obtained was measured, as in Example 1. Moreover, using the pellet (a3) thus obtained, the die swell ratio, the flow length, the Izod impact strength, the bending elastic module, the ethylene triad chains (EEE) in the ortho-dichlorobenzene-insoluble fraction, the ethylene content in the ortho-dichlorobenzene-insoluble fraction, and the degree of cross-linking parameter were measured.

Results thereof are shown on Table 1.

Comparative Example 1

A molded article was prepared as in Example 3, except that DeltaMax™ i300 was not added. Results thereof are shown on Table 1.

Comparative Examples 2 to 3, and 5

A molded article was prepared as in Example 1, except that DeltaMax™ i300 in Example 1 was replaced with the other component listed on Table 1. Results thereof are shown on Table 1.

Comparative Example 4

Weighing was carried out to weigh 77 parts by mass of propylene-ethylene block copolymer (A-1-1), 23 parts by mass of ethylene-α-olefin copolymer (B'), and 0.06 parts by mass of the organic peroxide master batch, and they are mixed uniformly and introduced into a raw material feeding inlet of an upmost stream side of a twin-screw extruder TEX44αII (Japan Steel Works, Ltd.), and melt-kneading were carried out with a cylinder temperature of 230° C., discharging amount of 50 kg/hour, a screw speed of 200 rpm, and an oxygen concentration of 2% at the feed hopper section, thereby preparing pellets (a14).

Using a mixture of 100 parts by mass of the pellet (a14) and 3 parts by mass of black pigment master batch (BP-8993D-30, Nippon Pigment Company Limited), the injection molding was carried out and gloss of the mirror surface of the molded article thus obtained was measured, as in Example 1. Moreover, using the pellet (a14) thus obtained, the die swell ratio, the flow length, the Izod impact strength, the bending elastic module, the ethylene triad chains (EEE) in the ortho-dichlorobenzene-insoluble fraction, the ethylene content in the ortho-dichlorobenzene-insoluble fraction, and the degree of cross-linking parameter were measured. Moreover, the SEM image of the broken cross-section after the Izod impact test is illustrated in FIG. 2. Worked out from the SEM image, the number average equivalent circle diameter of a rubber domain in the broken surface of the test piece after the Izod impact test was 0.80 μm.

Example 4

Weighing was carried out to weigh 77 parts by mass of propylene-ethylene block copolymer (A-1-1), 23 parts by mass of ethylene-α-olefin copolymer (B'), and 0.06 parts by mass of the organic peroxide master batch, and they are mixed uniformly and introduced into a raw material feeding inlet of an upmost stream side of a twin-screw extruder TEX44αII (Japan Steel Works, Ltd.), and meltkneading were carried out with a cylinder temperature of 230° C., discharging amount of 50 kg/hour, a screw speed of 200 rpm, and an oxygen concentration of 2% at the feed hopper section, thereby preparing pellets (a4). Next, after uniformly mixing 100 parts by mass of the pellet (a4) and 2 parts by mass of DeltaMax™ i300 (Milliken) to obtain a mixture, and the mixture was again introduced into a raw material feeding inlet of the upmost stream side of the twin-screw extruder TEX44αII (Japan Steel Works, Ltd.), and melt-kneading were carried out with a cylinder temperature of 205° C., discharging amount of 50 kg/hour, a screw speed of 400 rpm, and an oxygen concentration of 2% at the feed hopper section, thereby preparing pellets (b4).

One hundred parts by mass of the pellet (b4) and 3 parts by mass of black pigment master batch (BP-8993D-30, Nippon Pigment Company Limited) were mixed to obtain a mixture. Using the mixture, the injection molding was carried out as in Example 1, thereby obtaining a molded article. Results thereof are shown on Table 1.

Example 5

A molded article was prepared as in Example 1, except that the flowing of the nitrogen gas to the feed hopper section in melt-kneading of the mixture of 100 parts by mass of the pellet (a1) and 2 parts by mass of DeltaMax™ i300 (Milliken) was blocked, so that the oxygen concentration at the feed hopper section was changed from 2% to 20%. Results thereof are shown on Table 1.

Example 6

Weighing was carried out to weigh 100 parts by mass of propylene-ethylene block copolymer (A-1-2), and 2 parts by mass of the DeltaMax™ i300 (Milliken), and they are mixed uniformly and introduced into a raw material feeding inlet of an upmost stream side of a twin-screw extruder TEX44αII (Japan Steel Works, Ltd.), and melt-kneading were carried out with a cylinder temperature of 230° C., discharging amount of 50 kg/hour, a screw speed of 200 rpm, and an oxygen concentration of 2% at the feed hopper section, thereby preparing pellets (a6).

One hundred parts by mass of the pellet (a6) and 3 parts by mass of black pigment master batch (BP-8993D-30, Nippon Pigment Company Limited) were mixed to obtain a mixture. Using the mixture, the injection molding was carried out as in Example 1, thereby obtaining a molded article. Results thereof are shown on Table 2.

Example 7

A molded article was prepared as in Example 6, except that DeltaMax™ i300 was replaced with DeltaMax™ a200. Results thereof are shown on Table 2.

Comparative Example 6

A molded article was prepared as in Example 6, except that DeltaMax™ i300 was not added. Results thereof are shown on Table 2.

TABLE 1

| | | Resins | | Organic peroxide | Other components | | | | | Mixing and kneading condition Method of adding other components |
|---|---|---|---|---|---|---|---|---|---|---|
| | | Propylene-ethylene block copolymer (A-1-1) | EBR (FX555) | master batch | DM i300 | DM a200 | DM m100 | SEBS | Intune | |
| Example | 1 | 77 | 23 | 0.06 | 2 | | | | | After dispersion |
| Example | 2 | 77 | 23 | 0.06 | | 2 | | | | After dispersion |
| Example | 3 | 77 | 23 | | 2 | | | | | Batch |
| Example | 4 | 77 | 23 | 0.06 | 2 | | | | | After dispersion |
| Example | 5 | 77 | 23 | 0.06 | 2 | | | | | After dispersion |
| Comparative Example | 1 | 77 | 23 | | | | | | | — |
| Comparative Example | 2 | 77 | 23 | 0.06 | | | | 5 | | After dispersion |
| Comparative Example | 3 | 77 | 23 | 0.06 | | | | | 5 | After dispersion |
| Comparative Example | 4 | 77 | 23 | 0.06 | | | | | | — |
| Comparative Example | 5 | 77 | 23 | 0.06 | | | 2 | | | After dispersion |

| | | Measured value | | | | | Evaluation result | | |
|---|---|---|---|---|---|---|---|---|---|
| | | Ortho-dichlorobenzene insoluble fraction | | | 3D GPC Degrees of | CFC Elution | | | Gloss 60° |
| | | Capillo Δ — | Ethylene content weight % | EEE mol % | cross-linking parameter | amount at 50° C. wt % | Izod kJ/m2 | SPF mm | Mirror surface side |
| Example | 1 | 0.14 | 4.5 | 4.4 | 0.98 | 31.1 | 21 | 950 | 43 |
| Example | 2 | 0.22 | 4.0 | 4.1 | 0.93 | 29.8 | 12 | 1070 | 43 |
| Example | 3 | 0.11 | 3.4 | 3.4 | 1.06 | 30.5 | 13 | 946 | 40 |
| Example | 4 | 0.17 | 3.3 | 3.2 | 1.02 | 31.2 | 24 | 895 | 38 |
| Example | 5 | 0.16 | 3.6 | 3.7 | 1.01 | 31.3 | 21 | 1012 | 48 |
| Comparative Example | 1 | 0.73 | 0.62 | 0.9 | 1.12 | 31.9 | 9.7 | 922 | 68 |
| Comparative Example | 2 | 0.42 | 0.8 | 1.2 | 1.07 | 37.4 | 60 | 913 | 88 |
| Comparative Example | 3 | 0.52 | 2.0 | 2.1 | 1.11 | 35.0 | 53 | 904 | 87 |
| Comparative Example | 4 | 0.48 | 0.74 | 1.1 | 1.13 | 40.7 | 11 | 959 | 87 |
| Comparative Example | 5 | 0.36 | 3.1 | 3.5 | 1.02 | 31.2 | 3.2 | 1240 | 41 |

TABLE 2

| | | Resins | | | Mixing and kneading condition Method of adding | Measured value | | | | | Evaluation result | | |
|---|---|---|---|---|---|---|---|---|---|---|---|---|---|
| | | Propylene-ethylene block copolymer (A-1-2) | Other components | | | Capillo Δ | Ortho-dichlorobenzene insoluble fraction | | 3D GPC Degree of cross-linking parameter | CFC Elution amount at 50° C. wt % | Izod kJ/m2 | SPF mm | Gloss 60° Mirror surface side |
| | | | DM i 300 | DM a200 | | | Ethylene content weight % | EEE mol % | | | | | |
| Example | 6 | 100 | 2 | | Batch | 0.24 | 6.1 | 5.4 | 0.91 | 10.6 | 13.2 | 810 | 56 |
| Example | 7 | 100 | | 2 | Batch | 0.15 | 5.9 | 5.3 | 0.94 | 12.0 | 10.5 | 886 | 60 |
| Comparative Example | 6 | 100 | | | Batch | 0.69 | 3.1 | 4.0 | 1.09 | 18.1 | 8.1 | 714 | 72 |

As understood from Tables 1 and 2, the molded articles formed from the propylene polymer compositions satisfying the requirement (I) were low in gloss and excellent in impact strength.

In case where the polypropylene polymer composition according to the present invention was used in a large-sized molded article such as interiors of automobiles, the low gloss thereof provides outer appearance with excellent luxury and texture.

The invention claimed is:

1. A propylene polymer composition comprising a propylene polymer and an ethylene-α-olefin copolymer (provided that the ethylene-α-olefin copolymer is not the propylene polymer), wherein the propylene polymer composition is satisfying requirement (I):
   the requirement (I) being such that an absolute value of a difference between a die swell ratio at a shear rate of 24 sec$^{-1}$ and a die swell ratio at a shear rate of 6080 sec$^{-1}$ is 0.29 or less, and
wherein requirement (III) is satisfied,
   the requirement (III) being such that a degree of cross-linking parameter measured by 3D GPC is 1.06 or less.

2. The propylene polymer composition according to claim 1, wherein requirement (II) is satisfied,
   the requirement (II) being such that ethylene triad chains (EEE) in an ortho-dichlorobenzene-insoluble fraction are 2.0 mol % or more.

3. The propylene polymer composition according to claim 2, wherein an ethylene content in the ortho-dichlorobenzene-insoluble fraction is 3.1 mass % or more.

4. A method for producing the propylene polymer composition according to claim 1, the method comprising:
   a step of obtaining a composition precursor by melt-kneading the propylene polymer and the ethylene-α-olefin copolymer together (provided that the ethylene-α-olefin copolymer is not the propylene polymer); and
   a step of obtaining the propylene polymer composition by melt-kneading the composition precursor and a cross-linking agent together.

5. A molded article comprising the propylene polymer composition according to claim 1.

6. An automobile interior comprising the molded article according to claim 5.

* * * * *